(12) United States Patent
Behle et al.

(10) Patent No.: US 7,014,405 B2
(45) Date of Patent: Mar. 21, 2006

(54) PLASTIC NUT FOR MOUNTING ON A COMPONENT HAVING A PENETRATION

(75) Inventors: Jürgen Behle, Bad Laasphe (DE); Gottfried Koenig, Bad Laasphe (DE); Günter Welik, Bad Laasphe (DE)

(73) Assignee: EJOT GmbH & Co. KG, (DE)

( * ) Notice: Subject to any disclaimer, the term of this patent is extended or adjusted under 35 U.S.C. 154(b) by 0 days.

(21) Appl. No.: 10/775,105

(22) Filed: Feb. 11, 2004

(65) Prior Publication Data
US 2004/0156694 A1 Aug. 12, 2004

(30) Foreign Application Priority Data
Feb. 11, 2003 (DE) ................................. 103 05 610

(51) Int. Cl.
*F16B 13/04* (2006.01)
(52) U.S. Cl. .............................. 411/21; 411/34; 411/38; 411/182
(58) Field of Classification Search ............. 411/34.38, 411/182.21, 122
See application file for complete search history.

(56) References Cited

U.S. PATENT DOCUMENTS

| 3,313,083 A | * | 4/1967 | Flora ...................... 52/718.02 |
| 3,343,441 A | | 9/1967 | Van Buren, Jr. |
| 4,284,378 A | * | 8/1981 | Mizusawa .................... 411/21 |
| 4,312,612 A | * | 1/1982 | Thompson ................... 411/15 |
| 5,078,561 A | * | 1/1992 | Wollar et al. ................. 411/38 |
| 5,509,182 A | * | 4/1996 | Nakanishi .................... 24/297 |
| 5,690,454 A | | 11/1997 | Smith |
| 6,059,502 A | | 5/2000 | Koenig et al. |

FOREIGN PATENT DOCUMENTS

| GB | 2042665 | 9/1980 |
| JP | 2000-329121 | 11/2000 |

* cited by examiner

Primary Examiner—Flemming Saether
(74) Attorney, Agent, or Firm—Banner & Witcoff, Ltd.

(57) ABSTRACT

The invention relates to a plastic nut for mounting on a component having a penetration, said plastic nut being insertable into the penetration with a nut piece having a receiving hole for a screw and being provided with a flange for contact with one side of the component and with snap-on hooks for contact with the other side of the component, said snap-on hooks securing the plastic nut to the component, wherein, when in the relaxed position, said snap-on hooks on the one hand conform in their radial extent to the internal dimension of the penetration and on the other hand cover the receiving hole and spread apart when the screw is inserted and position themselves opposite the component. Disposed next to the snap-on hooks are walls extending in the spreading-apart direction, said walls extending from the flange to the nut piece and having reductions of their wall thickness—such thickness reductions extending in the central region thereof and in the spreading-apart direction—such that, when the screw is tightened, through bending of the walls at the thickness reductions the flange and the snap-on hooks contact the component on both sides.

7 Claims, 2 Drawing Sheets

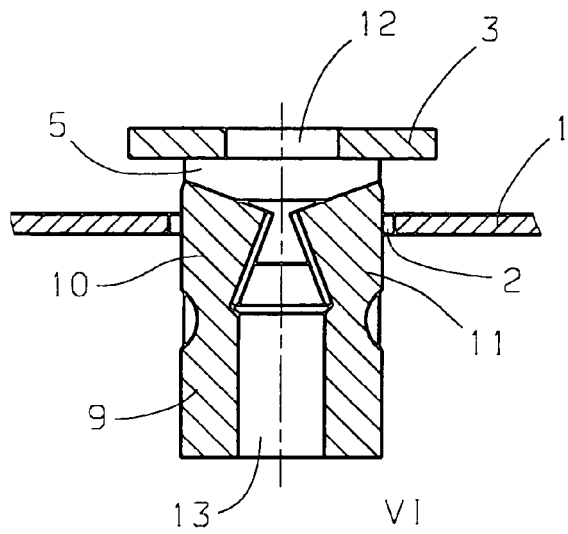
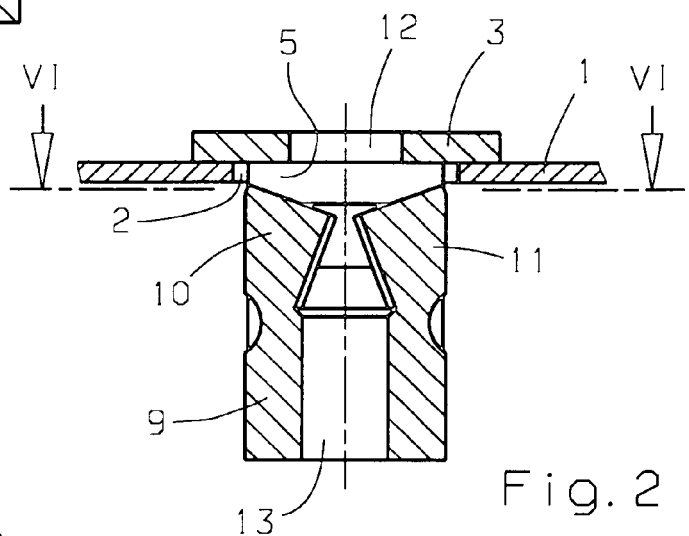
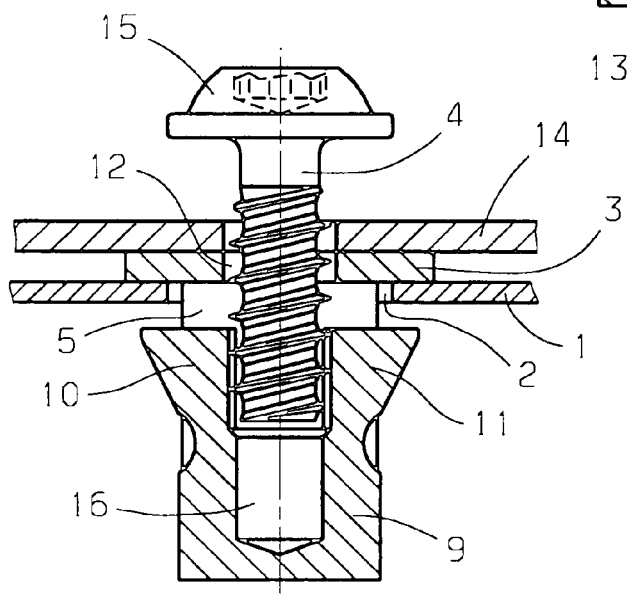
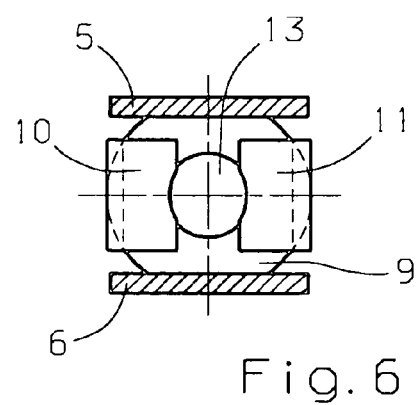
Fig. 1
Fig. 2
Fig. 3
Fig. 6

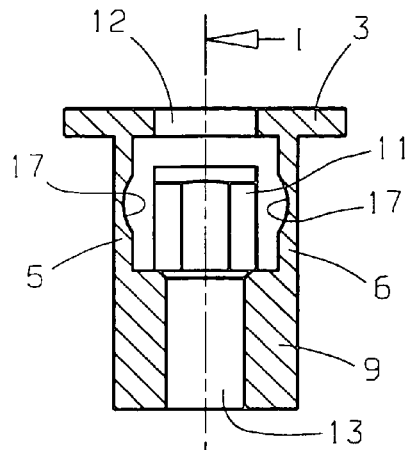
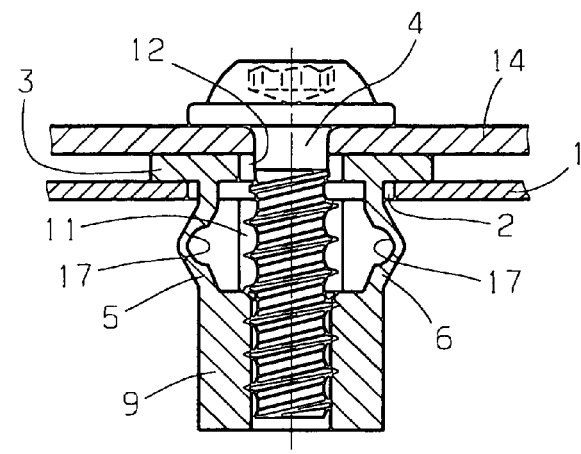
Fig. 4a    Fig. 4b
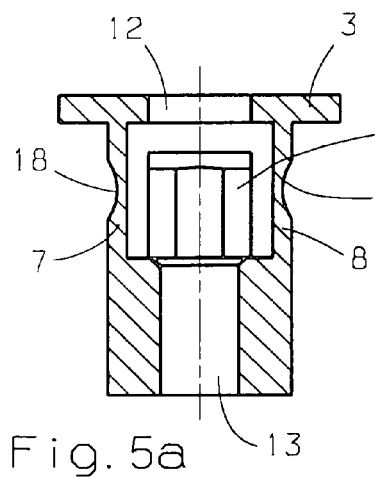
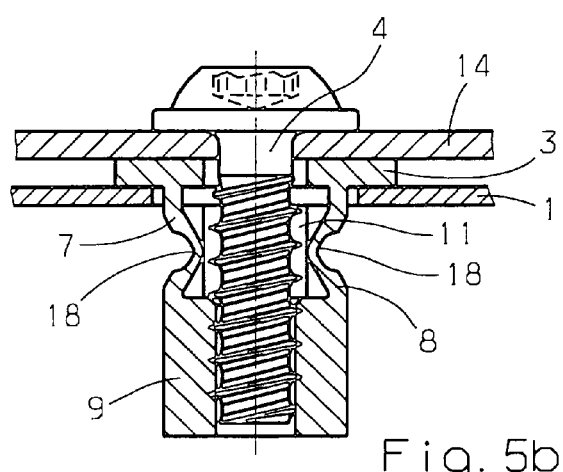
Fig. 5a    Fig. 5b
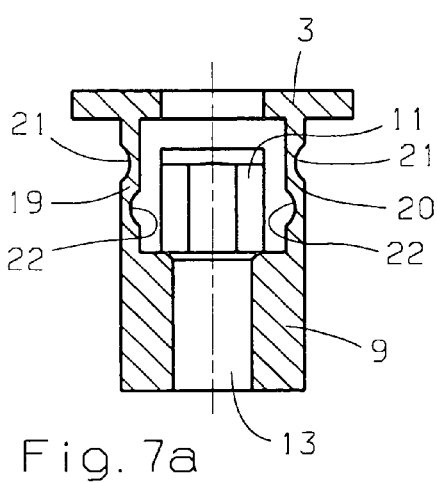
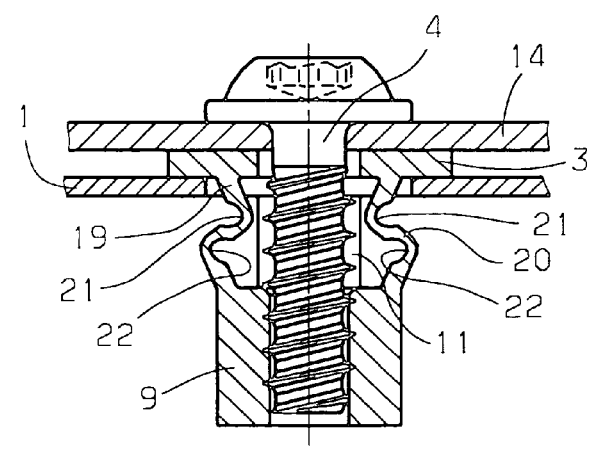
Fig. 7a    Fig. 7b

PLASTIC NUT FOR MOUNTING ON A COMPONENT HAVING A PENETRATION

The invention relates to a plastic nut for mounting on a component having a penetration, said plastic nut being insertable into the penetration with a nut piece having a receiving hole for a screw and being provided with a flange for contact with one side of the component and with snap-on hooks for contact with the other side of the component, said snap-on hooks securing the plastic nut to the component, wherein, when in the relaxed position, said snap-on hooks on the one hand conform in their radial extent to the internal dimension of the penetration and on the other hand cover the receiving hole and spread apart when the screw is inserted and position themselves opposite the component. Such a plastic nut is presented and described in German published patent application DE 197 28 988 A1, FIGS. 16a to d.

The object of the invention is to design the above-described plastic nut such that, through the tightening of the screw screwed into the nut piece, the plastic nut is brought into firm contact on both sides in relation to the component such that the distance between flange and snap-on hooks can be reduced to the thickness of the component, it therefore being possible for the plastic nut to be attached to components of different thickness.

The object of the invention is achieved in that disposed next to the snap-on hooks are walls extending in the spreading-apart direction, said walls extending from the flange to the nut piece and having reductions of their wall thickness—such thickness reductions extending in the central region thereof and in the spreading-apart direction—such that, when the screw is tightened, through bending of the walls at the thickness reductions the flange and the snap-on hooks contact the component on both sides.

Owing to the bendable walls, when the screw is tightened the snap-on hooks are brought closer to the component until, finally, the flange is in contact with one side of the component and the snap-on hooks are in contact with the other side of the component, this giving the plastic nut a defined position in relation to the component. This is important especially if the screw is used to attach to the plastic nut a further structural element which is then likewise to have and maintain a defined position in relation to the component. When the screw is thus tightened, the bending of the walls at the places where they are thinner allows the plastic nut to adapt to different thicknesses of a component in the form of, for example, a panel, this bending being all the greater, the thinner the respective component is. The bending of the walls additionally makes it possible to achieve the effect that those parts of the walls which are folded together, as it were, by the bending provide an orientation of the position of the nut piece in relation to the snap-on hooks/flange, as a result of which the bent walls are given an additional function.

On the one hand, it is possible for the thickness reduction of the walls to be disposed on the side thereof facing the snap-on hooks. In this case, the walls bend outwards, i.e. away from the snap-on hooks, the thickness reduction moving away from the snap-on hooks. The outwardly bent wall parts provide the nut piece, receiving the screw, with an additional resistance when the screw is turned, with the result that the inner stability of the plastic nut is considerably increased because it is more difficult for the nut piece to be turned with respect to the flange.

On the other hand, it is also possible for the thickness reduction of the walls to be disposed on the side thereof facing away from the snap-on hooks. In this case, the walls bend inwards, i.e. towards the snap-on hooks, and come into contact with the latter, with the result that, in this design, the snap-on hooks and the nut piece are centred with respect to the flange.

The thickness reduction of the walls may in each case be provided either at one single location or at a plurality of locations in the walls. In the latter case, the walls are designed such that the walls each have a plurality of thickness reductions, said thickness reductions being disposed alternately on the side facing away from and on the side facing the snap-on hooks. When the screw is tightened, this results in a meander-like bending of the walls, this making it possible to bridge a particularly wide range of difference in the distance between flange and snap-on hooks on the one hand and thickness of the component on the other hand.

The nut piece may be advantageously designed such that the receiving hole for the screw is in the form of a threaded hole in the region of the walls and in the region of the nut piece. This means that, when a screw is inserted, it is relatively easy for the two snap-on hooks to be forced away outwardly in opposition to their spring tension until the screw comes up against the threaded hole in the region of the nut piece and cuts its thread in this region when the screw is turned further.

The threaded hole may be in the form of a hole which is open at both ends or, alternatively, in the form of a blind hole. In the latter case, this may be advantageous for reasons of achieving a particular sealing effect.

Example embodiments of the invention are presented in the drawings, in which:

FIG. 1 shows a section through the plastic nut, said section running through the snap-on hooks in the axial direction of the plastic nut, more specifically during insertion into the penetration in a component;

FIG. 2 shows the same plastic nut in a position fully inserted through the penetration;

FIG. 3 shows the plastic nut in the position according to FIG. 2 with the screw screwed in, the snap-on hooks having been spread apart, but not yet in contact with the component;

FIG. 4a shows the plastic nut according to FIG. 2 turned through 90°, the section running through the walls on the insides of which the thickness reductions are disposed;

FIG. 4b shows the plastic nut according to FIG. 4a with outwardly bent walls with the screw firmly tightened;

FIG. 5a shows a plastic nut similar to the one according to FIG. 4a, but with the thickness reduction disposed on the outside of the walls;

FIG. 5b shows the plastic nut according to FIG. 5a with inwardly bent walls with the screw tightened;

FIG. 6 shows a section along line VI—VI from FIG. 2;

FIG. 7a shows a plastic nut with two consecutive thickness reductions in each wall, said thickness reductions being disposed alternately on the side facing and the side facing away from the snap-on hooks;

FIG. 7b shows the plastic nut according to FIG. 7a with inwardly and outwardly meanderingly bent walls with the screw tightened.

FIG. 1 presents the plastic nut in section along line I—I from FIG. 4a, said plastic nut having been inserted into the component 1, said component 1 being provided for this purpose with the penetration 2. The plastic nut has the flange 3, the purpose of which flange 3 is to contact the component 1 when the plastic nut has been fully inserted into the component 1 (see FIG. 2). The flange 3 is connected via the walls 5 and 6/7 and 8 shown in FIGS. 4 and 5 to the nut piece 9. Growing out of the nut piece 9 in the direction of the flange 3 are the two snap-on hooks 10 and 11, which are shown in their relaxed position in FIG. 1, in which position they can be pushed through the penetration 2 in the component 1. Since the snap-on hooks 10 and 11 are inwardly facing each other, they do not obstruct the passage of the plastic nut through the penetration 2, with the result that, when fully inserted, the plastic nut is in the position shown in FIG. 2 in which the flange 3 is in contact with the component 1. For receiving a screw 4 (see FIG. 3), the plastic nut has the through-hole 12 on the side of the flange 3 and the threaded hole 13 on the side of the nut piece 9. As shown in FIG. 3, a screw 4 which is to be screwed in can be passed with its threaded part through the through-hole 12 until the start of the thread comes up against the threaded hole 13, from which point the screw 4 can then be screwed in, preferably while cutting a thread.

FIG. 3 shows the screw 4 having been passed fully through the penetration 2. On being screwed into the nut piece 9, the screw 4 has forced the two snap-on hooks 10 and 11 away outwardly, the snap-on hooks 10 and 11 thus contacting the component 1 with their surfaces facing the flange 3. As shown in FIG. 3, the purpose of the plastic nut with screw 4 screwed thereinto is to attach to the component 1 the further structural element 14, which further structural element 14 is pressed against the flange 3 by the head 15 of the screw 4 when the latter is tightened.

In comparison with FIGS. 1 and 2, the nut piece 9 according to FIG. 3 has a special feature in that the screw hole 16 in FIG. 3 is a blind hole.

As shown in FIGS. 4a and b, when the screw 4 is tightened as described above, the two walls 5 and 6 become bent; more specifically, owing to their thickness reductions 17 disposed in their central region and on the side facing the snap-on hooks 10, 11 (see FIG. 4a), the walls 5 and 6 become bent outwardly, as shown in FIG. 4b. Because of this design of the plastic nut, when the screw 4 is tightened the plastic nut has exceeded a tolerance range which is determined by the bending of the walls 5 and 6 and which becomes clearly apparent from a comparison of FIGS. 4a and 4b. This tolerance range corresponds to the difference between the distance from the flange 3 to the snap-on hooks 10 and 11 in relation to the thickness of the component 1.

FIGS. 5a and 5b show a modification in comparison with FIGS. 4a and 4b. According to FIGS. 5a and 5b, namely, the walls 7 and 8 are provided with a thickness reduction 18 in their central region, because of which the walls 7 and 8 bend inwardly, i.e. in the direction of the snap-on hooks 10, 11, as shown in FIG. 5b.

The bending direction determined by the position of the thickness reduction 17/18 can be explained in that, near the thickness reduction, i.e. in the correspondingly thin part of the walls 5, 6 and 7, 8, there results a considerable concentration of pressure when the screw 4 is tightened, with the consequence that the pressure lines in the material of the walls run together either on one side or on the other side of the walls and concentrate there, this imparting to the pressure an oblique direction corresponding to said pressure and therefore imparting a bending direction thereto.

FIGS. 7a and 7b show a plastic nut in which the walls 19, 20 each have two thickness reductions 21 and 22, of which the thickness reductions 21 are disposed on the side facing away from the snap-on hooks 10, 11 and the thickness reductions 22 are disposed on the side facing the snap-on hooks 10, 11. When the screw 4 is screwed in, therefore, the result is a meander-like bending of the walls 19 and 20, this making it possible to bridge a correspondingly great tolerance range with said plastic nut.

What is claimed is:

1. Plastic nut for mounting on a component (1) having a penetration (2) and for use with a screw (4), the plastic nut being insertable into the penetration (2), said plastic nut comprising:
   a nut piece (9), the nut piece (9) having a receiving hole (13) for the screw (4), the nut piece (9) defining a longitudinal axis;
   a flange (3) for contact with one side of the component (1), the flange (3) having a receiving hole (12);
   snap-on hooks (10, 11) disposed for contacting an opposite side of the component (1), said snap-on hooks (10, 11) having upper abutment surfaces for securing the plastic nut to the component (1), said snap-on hooks (10, 11) adapted to bend away from the longitudinal axis of the nut piece (9) when the screw (4) is inserted, such that said snap-on hooks (10, 11) are adapted to move from (a) a relaxed initial position, wherein the snap-on hooks (10, 11) extend outward a distance from the longitudinal axis such that they fit through the penetration (2) and a distance inward to form a gap therebetween sized less than the receiving hole (12) in the nut piece, to (b) an expanded second position wherein the snap-on hooks (10, 11) spread out and extend perpendicularly a distance outward from the longitudinal axis such that they prevent the passage through the penetration (2), and the abutment surfaces are moved away from the longitudinal axis of the nut piece (9) to a position substantially perpendicular to the longitudinal axis of the nut piece (9); and
   walls (5, 6, 7, 8; 19, 20) disposed adjacent the snap-on hooks (10, 11), said walls (5, 6, 7, 8; 19, 20) extending from the flange (3) to the nut piece (9) and having reductions (17, 18; 21, 22) in their wall thickness disposed in a central region thereof between the flange (3) and the nut piece (9); and wherein when the screw (4) is tightened, the walls (5, 6, 7, 8; 19, 20) bend at the thickness reductions (17, 18; 21, 22) such that the flange (3) contacts said one side of the component (1) and the abutment surfaces of the snap-on hooks (10, 11) contact said opposite side of the component (1).

2. Plastic nut according to claim 1, characterized in that the thickness reduction (17) of the walls (5, 6) is disposed on the side thereof facing the snap-on hooks (10, 11).

3. Plastic nut according to claim 1, characterized in that the thickness reduction (18) of the walls (7, 8) is disposed on the side thereof facing away from the snap-on hooks (10, 11).

4. Plastic nut according to claim 1, characterized in that the walls (19, 20) each have a plurality of thickness reductions (21, 22), said thickness reductions (21, 22) being disposed alternately on the side facing away from and on the side facing the snap-on hooks (10, 11).

5. Plastic nut according to claim 1, characterized in that the receiving hole for the screw (4) is in the form of a through-hole (12) in the region of the walls (5, 6; 7, 8; 19, 20) and in the form of a threaded hole (13) in the region of the nut piece (9).

6. Plastic nut according to claim 5, characterized in that the threaded hole (13) is in the form of a blind hole (16).

7. Plastic nut according to claim 1, characterized in that the snap-on hooks are wedge shaped.

* * * * *